J. WHITAKER.
Lubricating-Boxes.
No. 158,765. Patented Jan. 12, 1875.
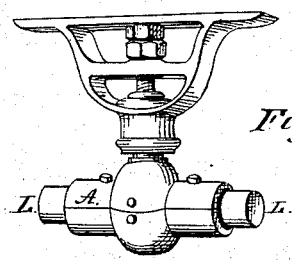
Fig. 1.
Fig. 2.
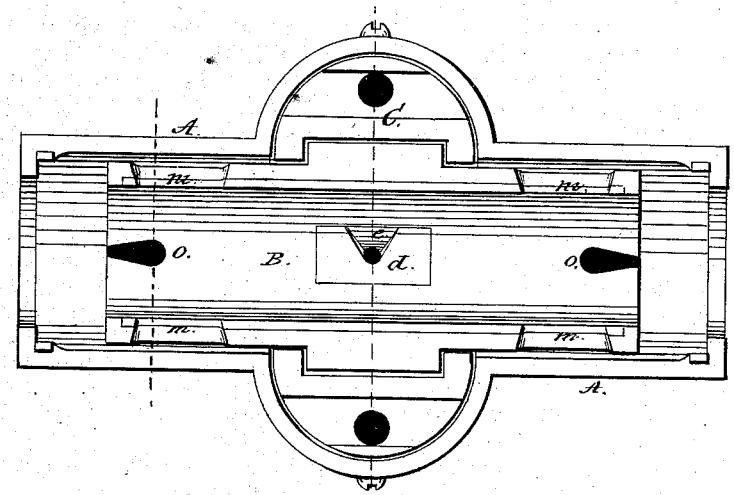
Fig. 3.
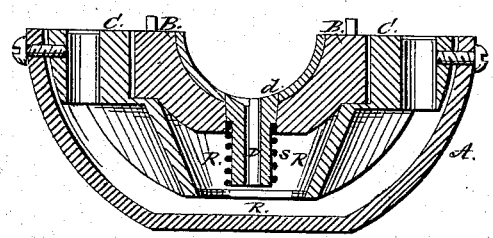
Fig. 4.
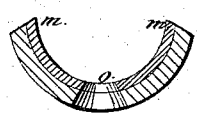
Witnesses:
H. Church
E. S. Karner
Inventor,
Joseph Whitaker
By Hill & Ellsworth,
His Atty's.

UNITED STATES PATENT OFFICE.

JOSEPH WHITAKER, OF WOONSOCKET, RHODE ISLAND.

IMPROVEMENT IN LUBRICATING-BOXES.

Specification forming part of Letters Patent No. 158,765, dated January 12, 1875; application filed November 27, 1874.

*To all whom it may concern:*

Be it known that I, JOSEPH WHITAKER, of Woonsocket, in the county of Providence and State of Rhode Island, have invented certain new and useful Improvements in Lubricating-Boxes; and I do hereby declare the following to be a full and exact description of the same, reference being had to the accompanying drawings forming part of this specification, in which—

Figure 1 is a perspective view of my improved lubricator in practical operation with the shafting attached. Fig. 2 is a top-plan view, showing the lower section of the box detached from the upper section. Fig. 3 is a cross-section in line $x\,x$ of said lower portion of the box detached from the upper portion, and Fig. 4 is a cross-section of the part in line $y\,y$.

Similar letters of reference in the accompanying drawings denote the same parts.

This invention belongs to that class of lubricators in which atmospheric pressure, induced directly by the motion of the journal or shaft, raises the lubricant from a suitable receptacle without the aid of any auxiliary mechanical devices, or the use of waste, sponge, or equivalent materials, with the disadvantages attendant thereon; and it relates specifically to that subdivision of said class in which a journal-bearing is employed, provided with an aperture near its center suitable for the reception of an air-tight tube, having an enlarged concave face to fit the periphery of the journal, the tube being supported or retained in constant contact with the journal by means of a coiled spring or other suitable device, so that when the journal is in motion a partial vacuum will be created in the tube, and the oil thereby caused to rise through it and lubricate the shaft and bearings.

The object of the invention is to improve and perfect the construction and operation of such lubricators, so that the flow of the lubricant to and from the journal shall be more steady and free than heretofore, the lubricant shall not be wasted, and the journal shall be prevented from gumming up, and shall be kept perfectly clean and smooth inside of the box, and free from oil and dirt outside of the box.

To these ends the invention consists, first, in forming a recess in the concave face of the movable tube, for the purpose of increasing the draft of the said tube, and more freely delivering the oil therefrom; secondly, in the formation of apertures at or near the ends of the box, of peculiar shape, as hereafter explained, for the purpose of retaining the lubricating matter and preventing waste thereof; and, thirdly, in the form or shape given to the edges of the box near the ends, for the purpose last above referred to.

In the drawings, A is the outside case of the hanger. B is the box or bearing, lined with babbitt or other suitable metal or material, and supported and held in place in the outside case by means of the chair C; and D is the adjustable tube, provided with the concave enlarged upper extremity, $d$, and with the spring $s$, or its equivalent, for holding the face $d$ up continuously against the shaft L. In the concave face $d$ I form a cavity, $e$, extending from the central opening of the tube to the edge of the face-plate, and preferably increasing in width, but decreasing in depth, toward said edge, as shown in the drawings. The oil rising through the tube to fill the partial vacuum induced by the rotation of the shaft spreads out in the cavity or recess $e$, comes in contact with the shaft, and is forced over the edge of the plate $d$, and caused to spread along the shaft, and thoroughly lubricate it throughout the whole length of the bearing. The form of the cavity is such that the motion of the shaft causes a much more perfect vacuum than heretofore, and the oil is not only accelerated in its movement through the tube, but is delivered from the top of the tube more readily and freely. At or near the ends of the bearing B I provide an orifice or orifices, O O, through which the surplus oil may escape and pass back into the reservoir R, thereby preventing the flow of oil along the shaft beyond the ends of the bearings, and keeping it clean and neat. To get the best results from these openings, they should extend from the ends of the bearing inward, gradually increasing in width, as shown in Fig. 2, and they should be wider at their lower than at their upper end, as shown in Fig. 4. Thus constructed, they not only scrape the oil from the shaft by reason of their sharp edges, but the inclination of their upper edges to the axis of rotation of the shaft, as seen in Fig. 2, seems to assist the centrifugal force of the shaft's rotatory movement in expelling the oil from its surface, and the gradual enlargement of the orifices from the end of the bearing inward operates also to cause the oil to run back from the open end of the orifices toward the middle of the bearings. The edges of the bearing at m m are beveled to a sharp line, which scrapes the oil from the shaft and delivers it into the receptacle below.

In practical operation the oil runs off freely through the openings O and over the edges m, and flows back into the cup or reservoir R, formed in the enlargement of the outer case beneath the tube D. The shaft inside of the bearing is thus kept in the best possible working order, while outside it is always clean, and there is no drip from it. The lubricant, constantly circulating, is preserved in excellent condition, the tube is prevented from filling or choking up, and the bearings are always in order.

If deemed desirable, the concave head of the tube may be made longer than shown in the drawings, and the recess more flaring. The form of the recess may also be somewhat modified without departing from the principle of my invention, as, for example, by substituting a series of grooves radiating from the upper end of the tube to different points along the edge of the concave plate d.

The bearing B, constructed in the manner described, can be formed of a suitable size to accommodate the shaft, and yet leave room for expansion by heat or other causes, thus obviating the friction inseparable from a closely-fitting journal-box. The spring-plate d follows the shaft whenever it is to any extent moved laterally or deflected from a straight line by the weight of the belting, and thus preserves the vacuum in the tube under all circumstances, and insures the proper lubrication of the journal and bearings.

Having thus described by improved lubricating-box, what I claim is—

1. The recess e, arranged in the concave head of the independent oil-elevating tube, substantially as and for the purposes described.

2. An independent oil-elevating tube having a recess or recesses, e, in combination with the spring and oil-reservoir, substantially as and for the purposes described.

3. The journal-box having the orifices O at or near its ends, substantially as described, for the purposes set forth.

4. The independent journal-box B, contained within the outside case, and provided with the beveled edges m m, substantially as and for the purposes set forth.

JOSEPH WHITAKER.

Witnesses:
SIMEON S. COOK,
MOSES HOBART.